(12) United States Patent
Sadovsky et al.

(10) Patent No.: US 8,990,634 B2
(45) Date of Patent: Mar. 24, 2015

(54) REPORTING OF INTRA-DEVICE FAILURE DATA

(75) Inventors: Vladimir Sadovsky, Redmond, WA (US); Vincent Orgovan, Jr., Bellevue, WA (US); Nathan Steven Obr, Seattle, WA (US); Scott Chao-Chueh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1029 days.

(21) Appl. No.: 12/939,056

(22) Filed: Nov. 3, 2010

(65) Prior Publication Data

US 2012/0110344 A1    May 3, 2012

(51) Int. Cl.
*G06F 11/00* (2006.01)
*G06F 11/07* (2006.01)

(52) U.S. Cl.
CPC ........ *G06F 11/0778* (2013.01); *G06F 11/0748* (2013.01)
USPC ............................ 714/47.1; 714/47.3; 714/25

(58) Field of Classification Search
USPC ............................................ 714/33, 25, 47.1
See application file for complete search history.

(56) References Cited

U.S. PATENT DOCUMENTS

| | | | |
|---|---|---|---|
| 6,170,065 B1 | 1/2001 | Kobata et al. | |
| 6,880,113 B2 | 4/2005 | Anderson et al. | |
| 7,036,129 B1 | 4/2006 | Korhonen | |
| 7,380,167 B2 | 5/2008 | Shaw | |
| 7,490,268 B2 | 2/2009 | Keromytis et al. | |
| 7,512,584 B2 | 3/2009 | Keith, Jr. | |
| 7,697,472 B2 | 4/2010 | Sadovsky et al. | |
| 7,770,165 B2 | 8/2010 | Olson et al. | |
| 2007/0067678 A1* | 3/2007 | Hosek et al. | 714/25 |
| 2007/0233858 A1* | 10/2007 | Goff et al. | 709/224 |
| 2007/0294596 A1* | 12/2007 | Gissel et al. | 714/48 |
| 2008/0307250 A1* | 12/2008 | Di Luoffo et al. | 714/4 |

OTHER PUBLICATIONS

Swift, et al., "Recovering Device Drivers", Retrieved at << http://nooks.cs.washington.edu/recovering-drivers.pdf >>, ACM Transactions on Computer Systems, (TOCS), vol. 24, No. 4, Nov. 2006, pp. 15.

Araki, et al., "A non-stop updating technique for device driver programs on the IROS platform", Retrieved at << http://ieeexplore.ieee.org/stamp/stamp.jsp?arnumber=00525144 >>, IEEE International Conference on Communications, ICC, Gateway to Globalization, Jun. 18-22, 1995, pp. 88-92.

\* cited by examiner

*Primary Examiner* — Sarai Butler
(74) *Attorney, Agent, or Firm* — Raghu Chinaguddabha; John Jardine; Micky Minhas

(57) ABSTRACT

Methods and a computing device are disclosed. A computing device may include a managed device having embedded firmware. When a failure occurs with respect to the managed device, drivers within the computing device may collect failure data from a driver stack of the computing device and from the managed device. The computing device may send the collected failure data to one or more second computing devices to be stored and analyzed. The computing device may include a health monitor for periodically collecting telemetry data from the computing device and the managed device. When the health monitor becomes aware of conditions indicative of a possible impending failure, the health monitor may trigger collection of sickness telemetry data from the computing device and the managed device. Collected data from the managed device may be made available to a vendor of the managed device.

20 Claims, 8 Drawing Sheets

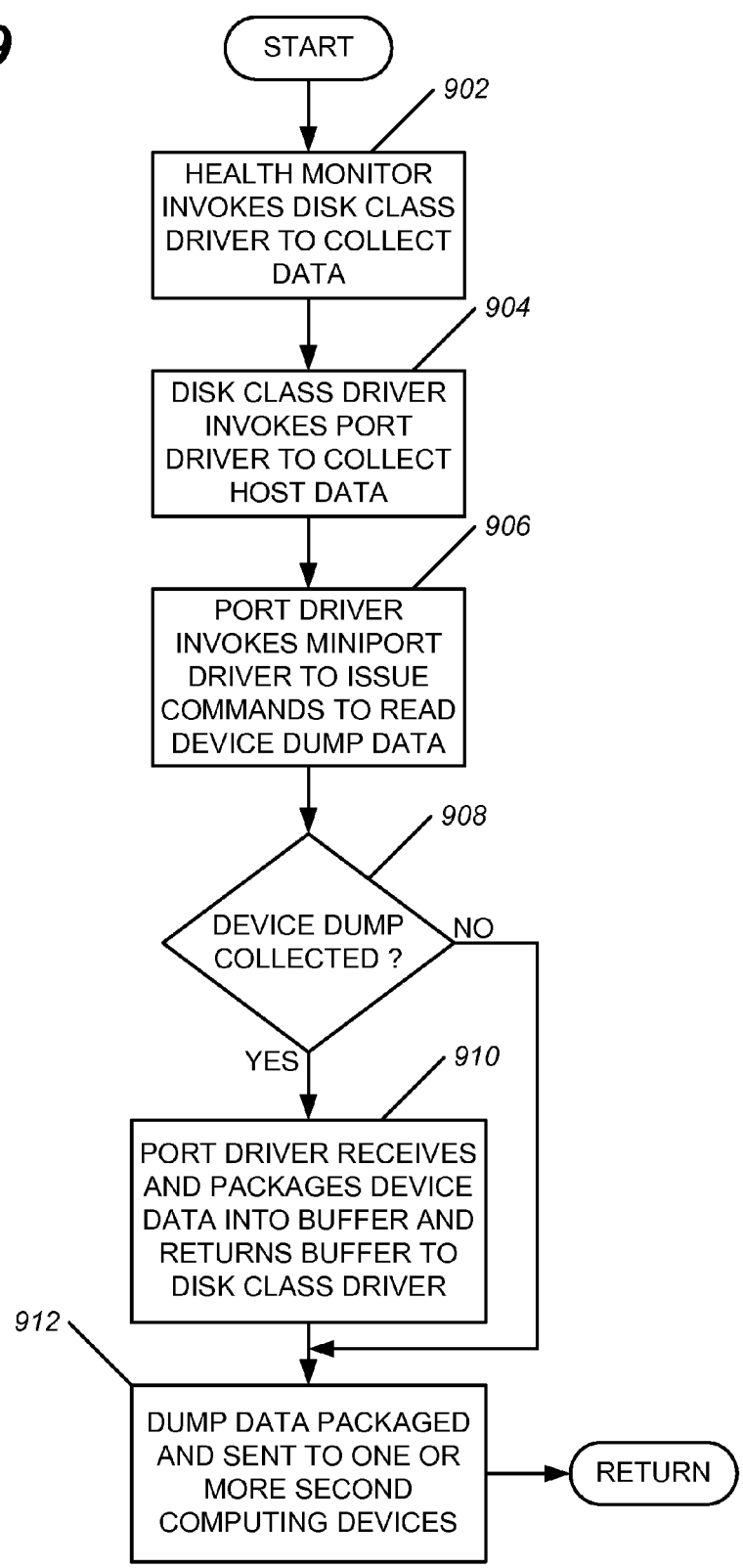

REPORTING OF INTRA-DEVICE FAILURE DATA

BACKGROUND

An existing operating system includes a reliability and quality monitoring system which targets host software components. The reliability and quality monitoring system performs business intelligence collection, analysis and servicing of software components (via, for example, software patching).

Various devices such as, for example, data storage devices, including but not limited to hard disk drives, optical disk drives, and solid state devices (SSDs) have become sophisticated systems that include multiple chips and execute complex embedded firmware, which may include hundreds and thousands of lines of code. The data storage devices may have complex states and are subject to various error and failure conditions such as, for example, vibrations and shocks with respect to hard disk drives, as well as other error and failure conditions, which in many cases may be caused by serviceable faults in the embedded software.

Typically, internal disk diagnostic software is extremely complex. When a data storage device experiences a failure condition, existing host systems do not collect data regarding operation of the embedded firmware from the data storage device. Diagnostic results may be kept in internal logs of a data storage device and may record details of impactful events. For most common devices diagnostic software may be driven directly by the operating system. The diagnostic results may not be provided to a vendor, with the exception of a problem data storage device under warranty which is returned to the vendor.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In an embodiment consistent with the subject matter of this disclosure, a computing device may include one or more managed devices such as, for example, a data storage device or other managed device which has embedded firmware or software and is managed by an operating system of the computing device. The computing device may periodically collect telemetry data from the computing device and the managed device. The collected telemetry data may be sent to at least one second computing device to be stored and analyzed.

In some embodiments, a health monitor in the computing device may periodically collect a snapshot of at least a portion of a memory of the computing device. The snapshot may include information with respect to a delay of the managed device in responding to requests including, but not limited to storage requests from the computing device, as well as other information. Based on the collected snapshot, the health monitor may determine whether the managed device may soon fail. When the health monitor determines that the managed device may soon fail (a sickness condition), the health monitor may periodically collect sickness data from the computing device and the managed device. In other embodiments the health monitor may collect observational data, which may be instrumental for analysis of improvements.

When either a failure condition occurs with respect to the managed device or monitoring data and information regarding embedded software indicates issues with respect to the managed device, the computing device may collect data, which may include a complete copy of a memory of the computing device, or a copy of one or more portions of the memory of the computing device. The computing device may further attempt to collect failure data from the managed device. The computing device may then send the collected data to at least one second computing device for storage and analysis.

The at least one second computing device may collect packages of data from a large number of computing devices with associated managed devices and may perform more extensive analysis of the collected packages of data as well as distribute subsets of the collected packages of data to other parties.

DRAWINGS

In order to describe the manner in which the above-recited and other advantages and features can be obtained, a more particular description is discussed below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIGS. 6-9 are flowcharts explaining processing in an exemplary embodiment consistent with the subject matter of this disclosure.

DETAILED DESCRIPTION

Figure 1:
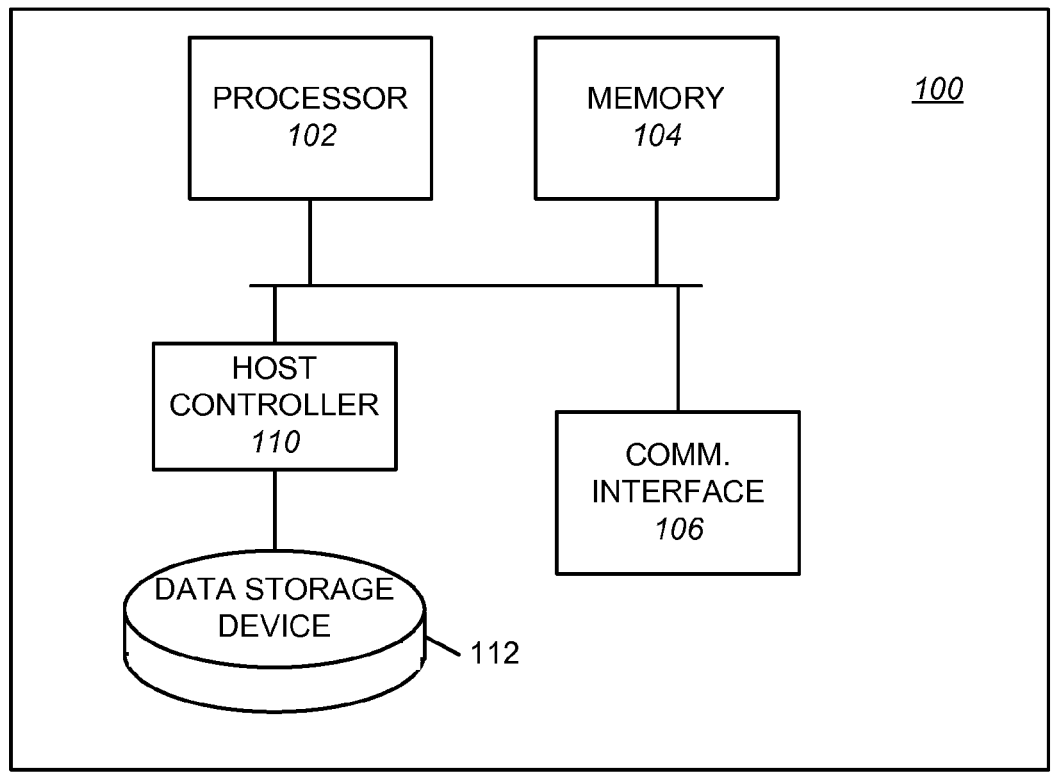
FIG. 1 is a functional block diagram of a computing device which may be used in an embodiment consistent with the subject matter of disclosure.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

In various embodiments, a host system such as, for example, a computing device, may include, or be connected to a managed device having embedded firmware or software and which is managed by an operating system of the computing device. For the sake of simplifying the following description, a data storage device, which is an exemplary managed device, is referred to in various examples. However, in other embodiments, the managed device may be another type of managed device such as, for example, a non-storage device.

The computing device may include a health monitor to periodically collect telemetry from a related component of the computing device, may be connected to a data storage device and may send the collected telemetry to at least one second computing device, which may be one or more backend computing devices, a server, or a server farm. The computing device may send the collected telemetry to the at least one second computing device via one or more networks.

The health monitor may periodically collect telemetry data from the computing device and the data storage device. For example, a snapshot of a portion of a memory of the computing device and a snapshot of a portion of a memory of the data storage device may be collected. The snapshot with respect to the computing device may include, but not be limited to, information regarding a length of time for the data storage device to respond to a request from the computing device, up to a predetermined amount of latest requests such as, for example, storage requests or other requests that the computing device attempted to send to the data storage device, as well as other information. The snapshot with respect to the data storage device may include information that may be helpful to a vendor of the data storage device. The health monitor, or another computing device component, may analyze at least a portion of the collected snapshot with respect to the computing device and may determine that the data storage device may soon fail. In one embodiment, the health monitor may determine that the computing device may soon fail when a delay of at least a predetermined amount of time occurs for the data storage device to respond to a request from the computing device.

When the health monitor determines that the data storage device may soon fail or the data storage device deviates from its expected behavior (a sickness condition), the health monitor may periodically collect telemetry data (referred to as "sickness telemetry data" in this situation) from the computing device and the data storage device at a more frequent time interval than a time interval for collecting the telemetry data when the data storage device appears to operate normally. The collected sickness telemetry data may include additional or different information than the telemetry data collected when the data storage device appears to operate normally. For example, the collected sickness telemetry data may include up to a predetermined number of last issued requests (for example, storage requests or other requests) the computing device attempted to send to the data storage device, and data from the data storage device such as, for example, up to a second predetermined number of the requests received by the data storage device from the computing device, as well as other data. The collected sickness telemetry data may then be sent to the at least one second computing device, where the collected sickness telemetry data may be stored, data mining and analysis may take place based on a sample of collected sickness telemetry data from one or more identical devices and at least a portion of the collected data storage device sickness telemetry data may be made available to a vendor of the data storage device via a vendor's computing device.

When a failure condition occurs with respect to the data storage device, the computing device may collect failure telemetry data such as, for example, a complete copy of a memory of the computing device, or a copy of one or more portions of the memory of the computing device, and the computing device may attempt to collect failure telemetry data from the data storage device. However, the computing device may not be able to communicate with the data storage device due to the failure condition. In this situation, collection of the failure telemetry data may be time shifted (postponed) or may be limited to a subset such as failure telemetry data only from the computing device. The collected failure telemetry data may be sent to the at least one second computing device, via one or more networks, for analysis and the collected failure telemetry data from the data storage device, as well as large samples of collected failure telemetry data from similar devices, may be made available to the vendor via the one or more networks and the vendor's computing device connected to one of the one or more networks.

When the data storage device and the computing device cannot communicate with each other due to the failure condition, the data storage device may collect data storage device failure telemetry data and may indicate a presence of the collected data storage device failure telemetry data to the computing device. The computing device may restart, may detect the presence of the collected data storage device failure telemetry data as a snapshot from a previous session, may collect the data storage device failure telemetry data from the data storage device, and may provide the collected data storage device failure telemetry data to the at least one second computing device via the one or more networks.

Exemplary Computing Device

FIG. 1 is a block diagram of an exemplary computing device 100, which may be employed to implement one or more embodiments consistent with the subject matter of this disclosure. Exemplary computing device 100 may include a processor 102, a memory 104, a communication interface 106, a bus 108, a host controller 110, and a data storage device 112. Bus 108 may connect processor 102 to memory 104, communication interface 106, and host controller 110. Host controller 110 may connect data storage device 112 with host controller 110.

Processor 102 may include one or more conventional processors that interpret and execute instructions. Memory 104 may include a Random Access Memory (RAM), a Read Only Memory (ROM), and/or other type of dynamic or static storage medium that stores information and instructions for execution by processor 102. The RAM, or the other type of dynamic storage medium, may store instructions as well as temporary variables or other intermediate information used during execution of instructions by processor 120. The ROM, or the other type of static storage medium, may store static information and instructions for processor 102. Communication interface 106 may communicate wirelessly or wired via a network to other devices. Host controller 110 may receive a request from processor 102, may communicate the request to data storage device 112, and may receive a response from data storage device 112. A request may include, but not be limited to a storage request, which may further include a request to read information from data storage device 112 or a request to write information to data storage device 112.

Data storage device 112 may include, but not be limited to a hard disk drive, an optical disk drive, an SSD, as well as other data storage media having embedded firmware.

Although FIG. 1 only shows one data storage device 112, multiple data storage devices may communicate with host controller 110.

Exemplary Data Storage Device

Figure 2:
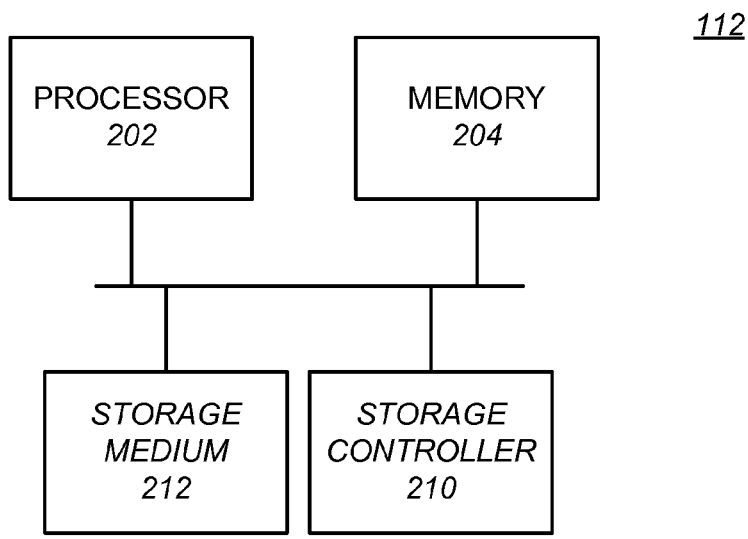
FIG. 2 is a block diagram of a data storage device having embedded firmware and included in the computing device of FIG. 1.

FIG. 2 is a block diagram of data storage device 112. The data storage device 112 may include a processor 202, a memory 204, a bus 208, a storage controller 210 and a storage medium 212.

Memory 204 may include a Random Access Memory (RAM), a Read Only Memory (ROM), and/or other type of dynamic and/or static storage device that stores information and instructions for execution by processor 202. The RAM, or the other type of dynamic storage device, may store instructions as well as temporary variables or other intermediate information used during execution of instructions by processor 120. The ROM, or the other type of static storage device, may store static information and instructions, such as, for example, firmware, for processor 202.

Processor 202 may include one or more conventional processors that interpret and execute instructions included in static storage or dynamic storage. For example, the instructions may be embedded firmware included in the static storage.

Storage medium 212 may include a hard disk, an optical disk, an SSD, or other medium capable of storing data. Storage controller 210 may receive requests from host controller 110 and may provide the received requests to processor 202. Further, storage controller 210 may receive information from processor 202, including, but not limited to data read from storage medium 212, and may provide the information to host controller 110. Bus 208 permits processor 202 to communicate with memory 204 and storage controller 210.

Although FIGS. 1 and 2 illustrate an exemplary embodiment having data storage device 112, in other embodiments data storage device 112 may be replaced with any managed device which has a processor, embedded code and a storage medium.

Exemplary Data Flow

Figure 3:
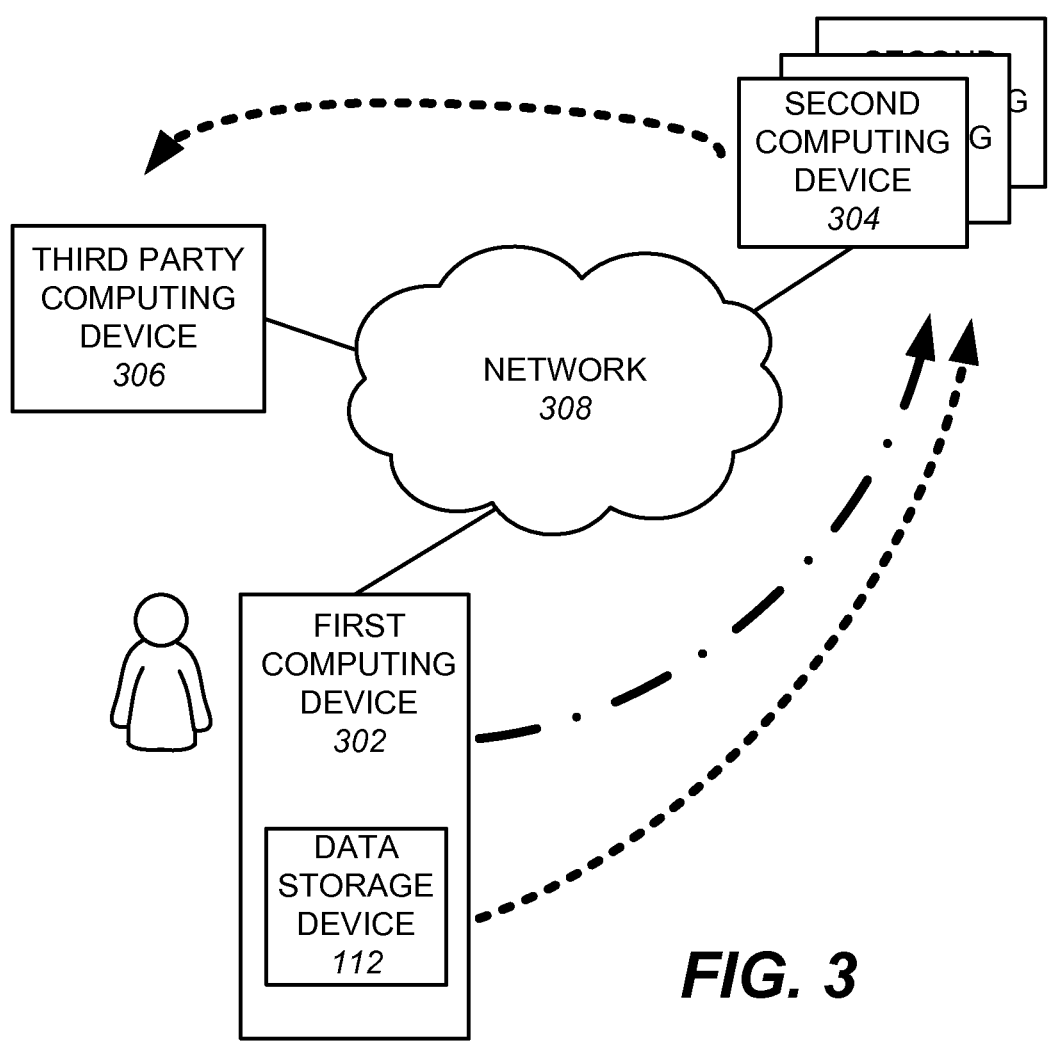
FIG. 3 illustrates an exemplary data flow in embodiments consistent with the subject matter of this disclosure.

FIG. 3 illustrates an exemplary data flow with respect to embodiments consistent with the subject matter of this disclosure. FIG. 3 shows a first computing device 302, one or more second computing devices 304, which in some implementations may include one or more backend computing devices, a server, or a server farm, and a third party computing device 306 connected to a network 308. In some embodiments, first computing device 302 may be implemented by computing device 100 and may be connected to data storage device 112 or a peripheral device, which may include a processor, embedded code (firmware or software) and a storage medium. One or more second computing devices 304 may also be implemented by one or more of computing devices 100.

Network 308 may include one or more networks, a local area network, a wide area network, a packet switching network, an ATM network, a frame relay network, a fiber optic network, a public switched telephone network, a wireless network, a wired network, another type of network, or any combination thereof.

First computing device 302 may collect telemetry data from first computing device 302 and data storage device 112 connected to first computing device 302. In some embodiments, data storage device 112 may included within and connected to first computing device 302. The collected telemetry data may be combined into a data package. The data package may include a number of sections, each of which may include a header. In some embodiments, the data package may include a first section for data collected from first computing device 302 and a second section for data collected from data storage device 112. The header for the first section may include information describing a version of software or firmware executing on first computing device 302, an indicator of a state of data storage device 112 at the moment of collection, as well as other information. The header for the second section may include a hash code calculated by data storage device 112, which may describe the state of data storage device 112, device identification information, which may be used by second computing device 304 to properly route accumulated samples of collected telemetry data, as well as other information which may be useful to a vendor of the data storage device 112.

In some embodiments, additional sections and corresponding headers may be included in the data package. For example, collected first computing device telemetry data, which may be shared among multiple parties, may be included in one section, collected first computing device telemetry data, which may not be shared among multiple parties may be included in a second section, collected data storage device telemetry data, which may be shared among multiple parties may be included in a third section, and collected data storage device telemetry data, which may not be shared among multiple parties, may be included in a fourth section.

In some embodiments, collected data storage device telemetry data, which may not be shared with multiple parties, included in the data package may be encrypted using, for example, a public key of a vendor of data storage device 112. Similarly, collected first computing device telemetry data, which may not be shared with multiple parties, may be encrypted using, for example, a public key of a party. In other embodiments, all collected data storage device telemetry data may be encrypted using a key such as, for example, the public key of the vendor of data storage device 112. In another embodiment, some portions of the collected data storage device telemetry data may be encrypted using a combination of public keys from multiple vendors in order to provide the multiple vendors with restricted shared access to at least some of the portions of the collected data storage device telemetry data.

In an alternate embodiment, collected telemetry data may be combined into multiple data packages.

First computing device 302 may send the data package to one or more second computing devices 304 via network 308. In FIG. 3, a line comprising dashes and dots represents the collected telemetry data from first computing device 302 and a line comprising only dashes represents the collected telemetry data from data storage device 112.

One or more second computing devices 304 may store and categorize the collected telemetry data included in the received data package. In some embodiments, one or more second computing devices 304 may categorize the collected data telemetry based on a hash code included in a header of a section of the data package having collected data storage device telemetry data. The hash code may provide information regarding a state of data storage device 112 at a time the data storage device telemetry data are collected. One or more second computing devices 304 may perform additional analysis on the collected data to, for example, determine commonalities, with respect to collected telemetry data that is categorized similarly, and determine trends of behavior deviating from normal by analyzing correlations of computing device configuration data and patterns of access with internal data storage device telemetry data reported to first computing device 302.

One or more second computing devices 304 may store the collected data storage device telemetry data in one or more files or queues. Each of the one or more files or queues may include collected data storage device telemetry data for a respective data storage device vendor or other third party. A third-party, such as, for example, a data storage device vendor or other third-party, may establish a connection to one or more second computing devices 304, via network 308 or another network, to request and receive the collected data storage device telemetry data from the one or more files or queues associated with the third-party.

Data fields from the section headers of the data package, some of which may be provided by data storage device 112, others by first computing device components (including, but not limited to drivers) may be used to properly and securely route telemetry data to a respective third party. Extra splicing of the telemetry data may be performed at second computing device 304 to separate parts of the data package, based on confidentiality (for example, if there are multiple disks, or data storage devices from different vendors).

Collected Data Types

First computing device 302 may combine collected data storage device telemetry data and host telemetry data (from first computing device 302), which may be a host driver dump, into the data package to be sent to one or more second computing devices 304. A format of the collected telemetry data may be extensible. The collected data storage device telemetry data may include a device dump, which may include a snapshot of firmware, and a device generated identifier reflecting a state of data storage device 112. The collected host telemetry data may further include other information, including, but not limited to environmental data and/or configuration data. In some embodiments, the device generated identifier may be a hash value and the device generated identifier and the collected data storage device telemetry data may be opaque to first computing device 302. In some embodiments, the hash value may only be parsed by a vendor of data storage device 112.

A host storage driver stack of first computing device 302 may generate and collect a snapshot of up to a predetermined number of requests, including, but not limited to storage requests first computing device 302 last attempted to send to data storage device 112. Further, the host storage driver stacks, as well as controller stacks, may add environmental data, which may assist device vendor software executing on third party computing device 306 to analyze correlations.

First computing device 302 may collect a number of types of telemetry data. For example, a lightweight device dump may be periodically collected from data storage device 112 and may include a set of device internal counters or other lightweight data. Diagnostic and monitoring data may be collected from data storage device 112 by a host storage driver of first computing device 302 and may be understandable to an operating system of first computing device 302. A host driver dump may be collected from first computing device 302 and may include a latest history of up to a predetermined number of requests with respect to data storage device 112, a topology of interconnections, a driver version and other information that may be useful to the vendor of data storage device 112 for problem resolution. A host driver may collect telemetry data from data storage device 112 by using common acquisition commands for all devices, combined with configurable methods of accessing vendor specific data (configured through a data store of first computing device 302 such as, for example, a registry or other data store).

Device identification data may be collected from data storage device 112. The device identification data may include identifiers that identify data storage device 112 and firmware of data storage device 112. For example, the device identification data may include a vendor ID, a product ID, a firmware revision and a manufacturing cookie. The device identification data may be accessible to the operating system of first computing device 302 and application software executing on first computing device 302. The host storage driver stack of first computing device 302 may log an event in an event log when an I/O failure is detected with respect to data storage device 112. Information regarding the logged event as well as statistics may be uploaded to second computing device 304 for a reliability analysis. For instance, failures to boot (disk hangs) may be detected with subsequent successful boots.

Storage Device Drivers

Figure 4:
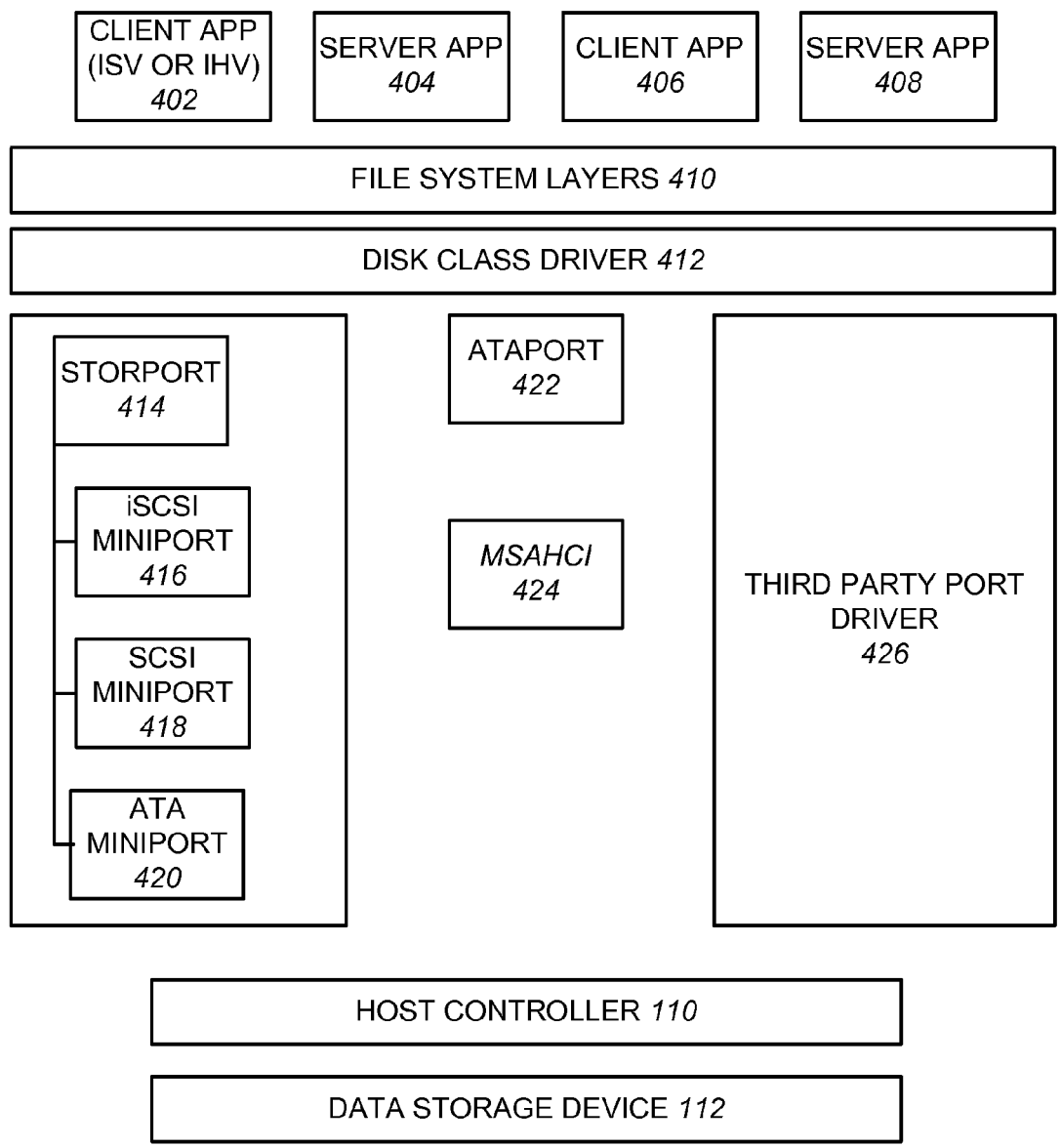
FIG. 4 shows exemplary storage driver stacks of a computing device which communicate with a data storage device having embedded firmware.

A driver is a computer program that allows higher-level computer programs to interact with a hardware device. FIG. 4 illustrates exemplary driver stacks which may be employed in various embodiments consistent with the subject matter of this disclosure.

Various applications, such as, for example, a client application 402 (from an independent software vendor or an independent hardware vendor), a server application 404, a client application 406, and a server application 408 may interface with file system layers 410 by making calls to an application program interface (API).

File system layers 410 may interface with a class driver including, but not limited to a disk class driver 412. A class driver may perform common operations for a class of devices, such as, for example, disk storage devices, or other types of devices. Disk class driver 410 may interface with a Storport driver 414, an ATAport driver 422, a third-party port driver 426, or other port driver.

Storport driver 414 is included in operating systems available from Microsoft Corporation of Redmond, Wash. Storport driver 414 is a port driver which may receive a request, including, but not limited to a storage request from disk class driver 412 and may complete the request if the request does not include a data transfer, or the request may be passed on to an Internet Small Computer System Interface (iSCSI) miniport driver 416 or a hardware-specific miniport driver, such as, for example, a Small Computer System Interface miniport driver 418 or an Advanced Technology Attachment (ATA) miniport driver 420. iSCSI is a storage transport protocol that moves SCSI input/output (I/O) traffic over a transmission control protocol/internet protocol (TCP/IP) connection. ATA miniport driver 420 translates storage requests into hardware-specific requests for a data storage device.

ATAport driver 422 is a port driver that translates requests, including, but not limited to storage requests from an operating system into an ATA protocol. A Microsoft Advanced Host Controller Interface (MSAHCI) driver 424 is a miniport driver included in operating systems from Microsoft Corporation and is for operating a serial ATA host bus adapter.

Third-party port driver 426 receives requests from disk class driver 412 and translates the requests into hardware-specific requests for a third-party data storage device.

Host controller 110 receives the requests from the miniport drivers and provides the requests to data storage device 112. Host controller 110 may also receive information from data storage device 112 and may provide the received information to an appropriate port driver or miniport driver.

Because formats of the telemetry data may be extensible, in some embodiments, a host controller driver and firmware may participate in telemetry data collection in a same way as other drivers.

Exemplary Operation

Figure 5:
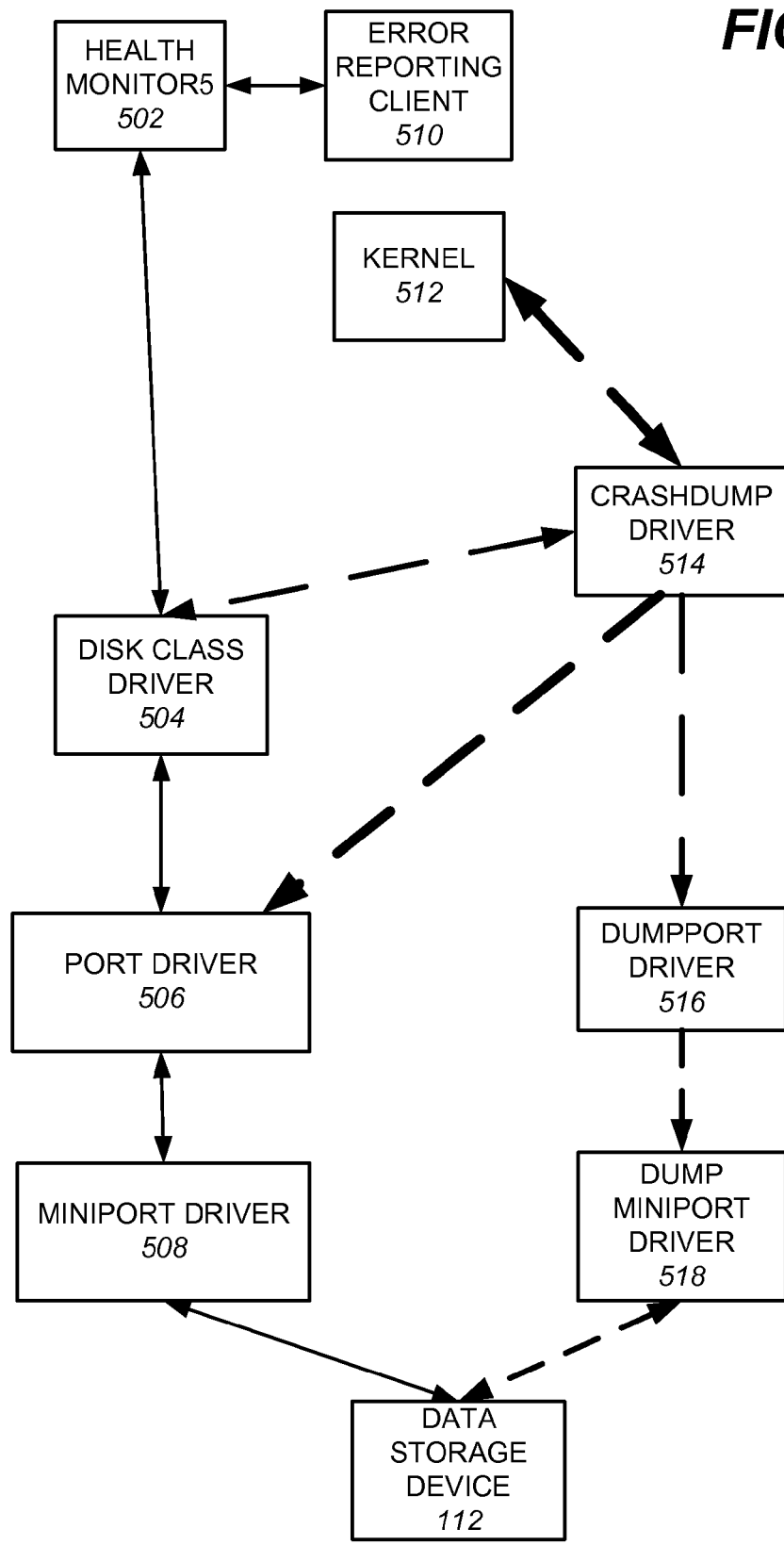
FIG. 5 is a block diagram showing components of a computing device and interactions among the components when communicating with a data storage device having embedded firmware.

FIGS. 6-9, with reference to FIG. 5, are flowcharts for illustrating exemplary operation of various embodiments. FIG. 5 illustrates a number of modules executing in first computing device 302. The modules may be software or firmware executed by a processor of first computing device 302 in some embodiments. In other embodiments, the modules may be implemented via a combination of software and hardware. The hardware may include, one or more hardware logic components such as for example, an application specific gate array (ASIC) or other hardware logic component. The modules may include a health monitor 502, a disk class driver 504, a port driver 506, a miniport driver 580, an error reporting client 510, an operating system kernel 512, a crashdump driver 514, a dumpport driver 516, a dump miniport driver 518, and data storage device 112.

Figure 6:
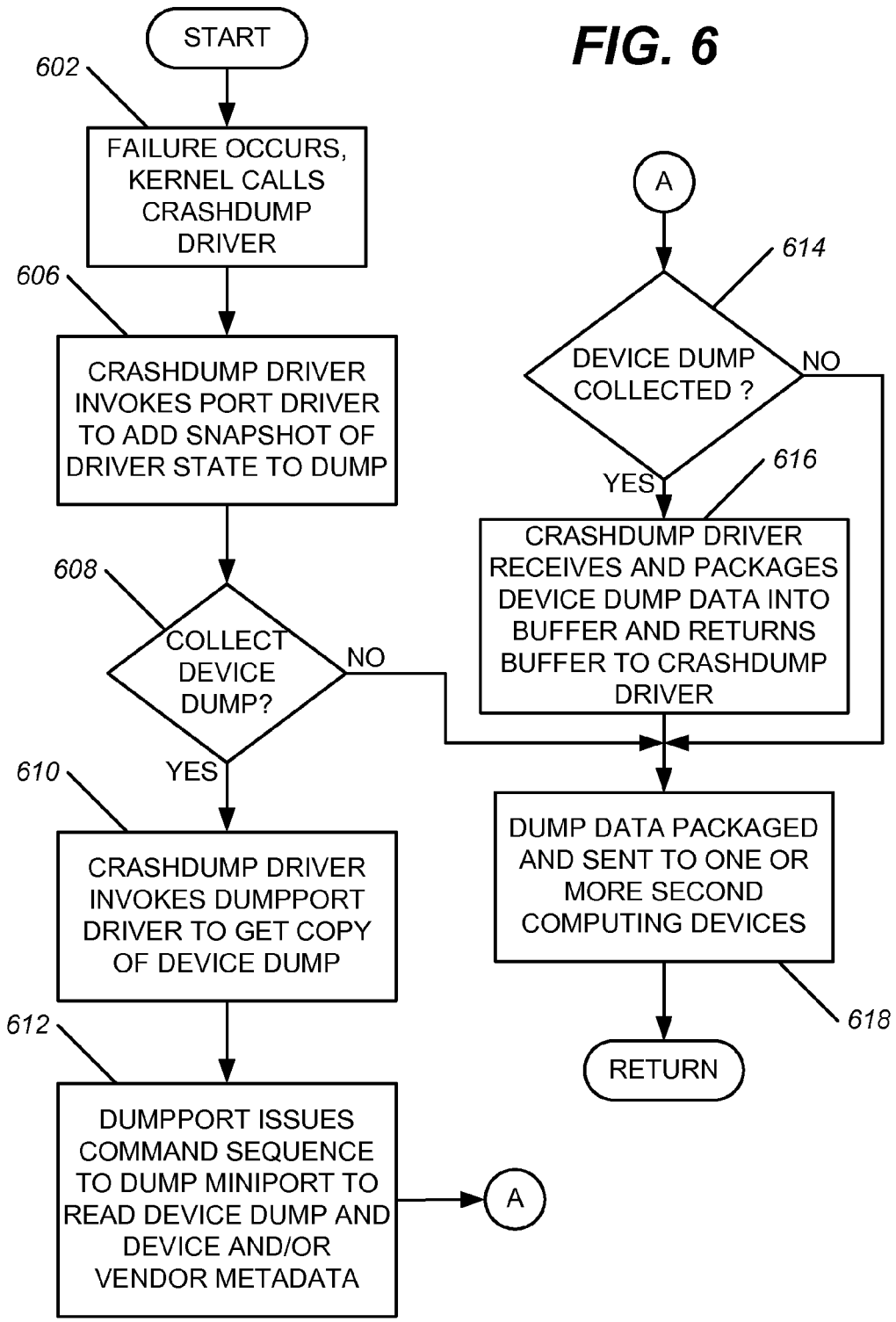

Starting with the flowchart of FIG. 6, kernel 512 of first computing device 302 may become aware of a failure concerning data storage device 112 and kernel 512 may invoke crashdump driver 514 to collect dump data (act 602).

Crashdump driver 514, dumpport driver 516, and dump miniport driver 518 are a parallel driver stack with respect to a driver stack including disk class driver 504, port driver 506, and miniport driver 508. Crashdump driver 514, dumpport driver 516, and dump miniport driver 518 may include crashsafe code. Crashsafe code is code which is safe to execute at a time of crashdump telemetry collection (e.g. no interrupts, no synchronization primitives usage).

Crashdump driver 514 may invoke port driver 506 to include a snapshot of a host driver state, with respect to first computing device 302 (act 606). The snapshot of the host driver space may include up to a predetermined number of latest requests, including, but not limited to storage requests from first computer device 302 to data storage device 112, as well as other information.

Crashdump driver 514 may determine whether to collect a device dump from data storage device 112 (act 608). In some embodiments, crashdump driver 514 may check a failure code and determine whether the failure code matches any one of a number of failure codes of interest. If the failure code matches one of the number of failure codes of interest, then crashdump driver 514 may determine that a device dump is to be collected. Otherwise, crashdump driver 514 may determine that a device dump is not to be collected. Crashdump driver 514 may also throttle data upload to second computing device 304 in order to reduce chances of overloading second computing device 304. For instance, extra configuration parameters may be employed to limit a size of telemetry data collected or a frequency of collecting telemetry data samples.

If crashdump driver 514 determines that a device dump is to be collected, then crashdump driver 514 may invoke dumpport driver 516 to obtain a copy of the device dump (act 610). Dumpport driver 516 may then issue a command sequence to dump miniport driver 518 to read the device dump and device and/or vendor metadata for routing. In one embodiment the device and/or vendor metadata for routing may include a hash code value from data storage device 112 (act 612).

Dump miniport driver 518 may then determine whether data storage device 112 has a device dump to collect (act 614). If data storage device 112 has a device dump to collect, then dumpport driver 516 may receive the device dump from miniport driver 518, may package the device dump into a buffer, and may return the buffer to crashdump driver 514 (act 616). Crashdump driver 514 may then cause a host driver dump (host telemetry data) and the device dump (data storage device telemetry data) to be sent to one or more second computing devices 304 (act 618). In one embodiment crashdump driver 514 may provide the packaged collected dump data to error reporting client 510, which may place the data in a queue of data to be sent to one or more second computing device 304. In another embodiment, crashdump driver 514 may send the packaged collected dump data to one or more second computing devices 304. The process may then be completed. In some embodiments, crashdump driver 514 may also verify whether data storage device 112 previously captured an internal dump, and if so, obtain the internal dump. This is different from asking first computing device 302 to take an immediate snapshot. As a result, this allows time shifting and collecting of "failed boot" telemetry as described earlier.

If, during act 614, dump miniport driver 508 determines that data storage device 112 does not have a device dump to collect, then act 618 may be performed to package the host driver dump (host telemetry data) and send the host driver dump to one or more second computing devices 304. As previously mentioned, the telemetry data may be packaged into multiple sections, each of which may have a header. For example, a first section may include host telemetry data which may be shared among multiple parties and a second section may include host telemetry data which may not be shared among multiple parties.

If, during act 608, crashdump driver 514 determines that data storage device 112 does not have device data to collect, then crashdump driver 514 may package the host driver dump and may cause the host data driver data to be sent to one or more second computing devices 304 (act 618).

Figure 7:
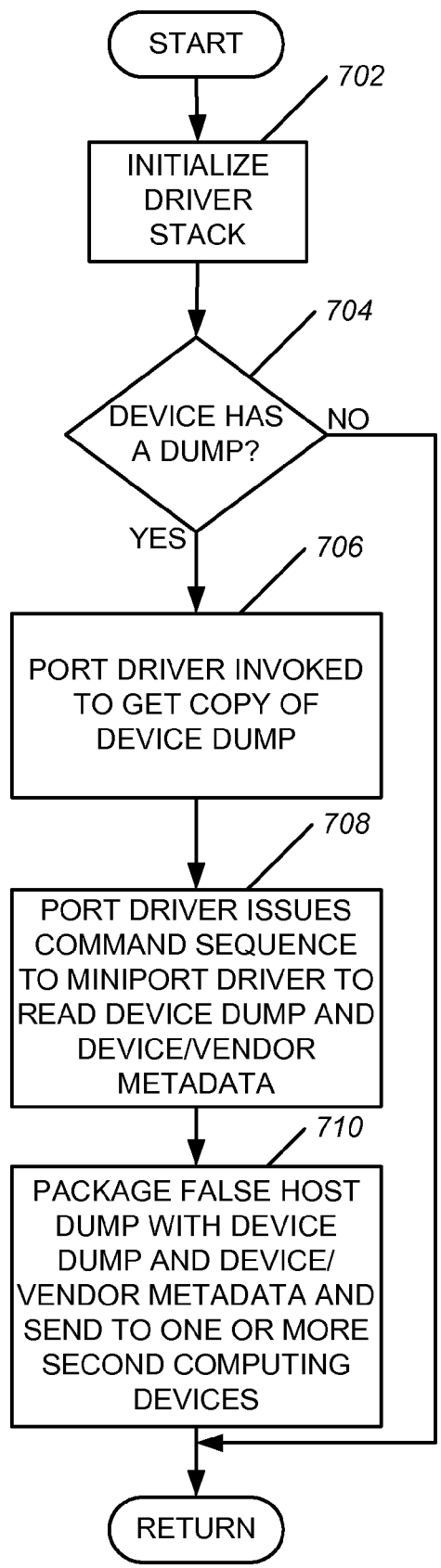

FIG. 7, with reference to FIG. 5, illustrates an exemplary process with respect to the host driver stack during initialization. The process illustrates time shifting of collection of data storage device telemetry or dump data. The process may begin with health monitor 502 making a call to disk class driver 504 to initialize the host driver stack (act 702). Alternatively, kernel 512 may invoke disk class driver 504 to initialize the host driver stack.

Disk class driver 504 may then determine whether data storage device 112 has a device dump (data storage device telemetry data) to be collected (act 704). If disk class driver 504 determines that data storage device 112 has a device dump to be collected (for example, during an abnormal or failure condition, data storage device 112 may have created an internal dump which first processing device 304 was unable to obtain until after a system restart occurred), then disk class driver 504 may invoke port driver 506 to obtain a copy of the device dump and the device and/or vendor metadata (act 706). Next, port driver 506 may issue a command sequence to miniport driver 508 to read the data storage device dump and the device and/or vendor metadata from data storage device 112 and place the data storage device dump and the device and/or vendor metadata into a buffer (act 708). Port driver 506 may provide the buffer to disk class driver 504, which may then package the data storage device dump and the device and/or vendor metadata and a false host driver dump (because a host driver dump typically is not available during initialization) and may send the package to one or more second computing devices 304 (act 710). Thus, collection of data storage device telemetry or dump data may be time shifted from a time when the telemetry or dump data is created until after restart of first computing device 302.

In some embodiments, disk class driver 504 may provide the package to error reporting client 510 and error reporting client 510 may send the package to one or more second computing devices 304. In other embodiments, disk class driver 504 may cause the package to be sent to one or more second computing device 304 via other means.

Figure 8:
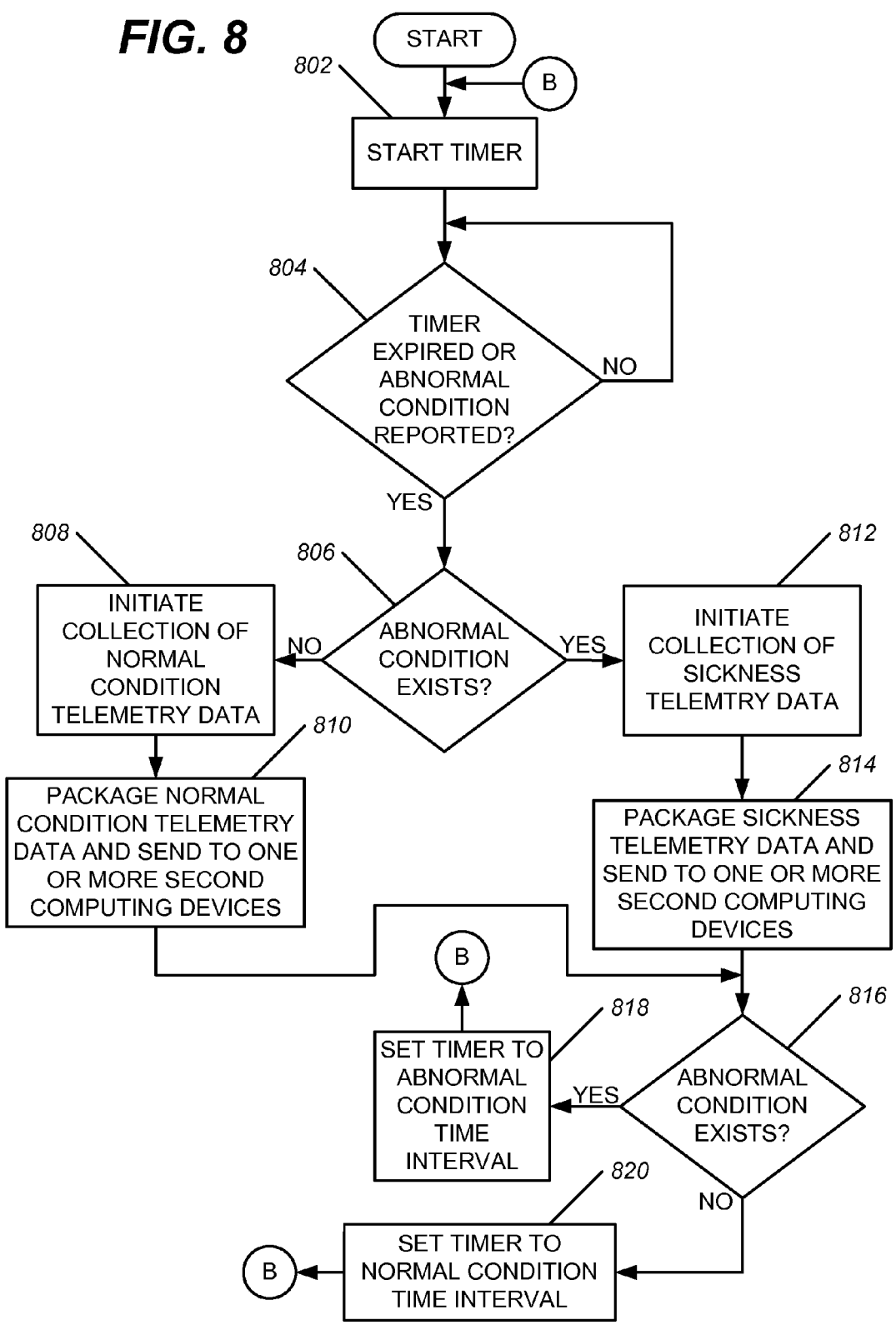

FIG. 8, with reference to FIG. 5, illustrates an exemplary process for health monitor 502 to collect dump (telemetry) data. The process may begin with health monitor 502 starting a timer (act 802). Initially, the timer may be set for a time interval for collecting dump data (telemetry data) under normal operating conditions with respect to data storage device 112.

Health monitor 502 may then determine whether the timer expired or an abnormal condition is reported (act 804). Examples of abnormal conditions may include a predetermined number of retry requests with respect to data storage device 112, unusual delays by data storage device 112 with respect to completing a request, as well as other indicators of abnormal conditions.

If either a timer expired or an abnormal condition was reported, then health monitor 502 may determine whether an abnormal condition exists (act 806). If an abnormal condition is determined not to exist, then health monitor 502 may initiate collection of normal condition telemetry data, which may include host driver data and device dump data, via an application program interface (API) (act 808). The host driver data may include up to a predetermined number of latest requests, including, but not limited to storage requests from first computing device 302 to data storage device 112. The host driver data may also include environmental parameters that describe a running state of first computing device 302. The environmental parameters may be helpful to a vendor of data storage device 112 when trying to reproduce abnormalities. The device dump data format may be identical to the device dump data collected by the crashdump driver stack. Alternatively, the device data may include one format during normal telemetry collection and another format during sickness telemetry collection.

If, during act 806, health monitor 502 determines that an abnormal condition exists, then health monitor 502 may initiate sickness telemetry data collection via an API (act 812). Health monitor 502 may then package the collected sickness telemetry data from first computing device 302 and data storage device 112 and may send the packaged collected sickness telemetry data to one or more second computing device 304 (act 814).

FIG. 9 illustrates an exemplary process for packaging of normal or sickness telemetry data and sending the normal or sickness telemetry data to one or more second computing devices 304. The process begins with health monitor 502 invoking disk class driver 504, via an API, to collect telemetry data (act 902). Disk class driver 504 may invoke port driver 506 to collect normal or sickness host telemetry data (act 904). Port driver 506 may issue commands to miniport driver 508 to request normal or sickness device telemetry data from data storage device 112 (act 906).

Port driver 506 may then determine whether data storage device 112 has normal or sickness device telemetry data to be collected (act 908). If so, then port driver 506 may receive the normal or sickness telemetry data into a buffer from data storage device 112 via miniport driver 508 and may return the buffer to disk class driver 504 (act 910). Disk class driver 504 may package the host telemetry data together with the device telemetry data and may provide the packaged telemetry data to error reporting client 510 for sending to one or more second computing devices (act 912).

Returning to FIG. 8 after performing either act 810 or act 814, health monitor 502 may determine whether an abnormal condition exists (act 816). If an abnormal condition is determined to exist, then health monitor 502 may set the timer to an abnormal condition time interval (act 818). Otherwise, health monitor 502 may set the timer to a normal condition time interval (act 820). Acts 802-820 may again be performed.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Other configurations of the described embodiments are part of the scope of this disclosure. For example, in other embodiments, an order of acts performed by a process may be different and/or may include additional or other acts.

Accordingly, the appended claims and their legal equivalents define embodiments, rather than any specific examples given.

We claim as our invention:

1. A machine-implemented method comprising:
    detecting, by a health monitor, the health monitor in communication with a computing device, a failure condition or an abnormal condition with respect to a managed device that executes embedded firmware and is physically connected to the computing device;
    collecting periodically, by the health monitor in response to determining that the managed device may soon fail, first data from the computing device and second data from the managed device, the first data and the second data including snapshot information that is helpful for diagnosing a cause of the failure condition or the abnormal condition, said snapshot information further comprising information regarding delays of the managed device in response to requests from the computing device;
    combining, by the computing device, the first data and the second data into at least one data package; and
    providing, by the computing device, the at least one data package to one or more second computing devices for analysis.

2. The machine-implemented method of claim 1, wherein the at least one data package has an extensible format.

3. The machine-implemented method of claim 1, wherein the first data includes environmental data and configuration data with respect to the computing device.

4. The machine-implemented method of claim 1, wherein the first data includes information with respect to a number of latest requests the computing device attempted to send to the managed device.

5. The machine-implemented method of claim 1, further comprising:
    periodically collecting and monitoring first telemetry data by the computing device, the first telemetry data including information with respect to a state of the computing device.

6. The machine-implemented method of claim 5, further comprising:
    detecting, by the computing device, a sickness condition with respect to the managed device;
    triggering, by the computing device in response to the detecting of the sickness condition, collection of sickness telemetry data including first sickness telemetry data from the computing device and second sickness telemetry data from the managed device;
    combining, by the computing device, the first sickness telemetry data and the second sickness telemetry data into a second data package including the sickness telemetry data; and
    providing, by the computing device, the second data package to the second computing device.

7. The machine-implemented method of claim 1, further comprising:
performing, by the computing device upon startup:
determining that the managed device has new second data to be collected,
collecting the new second data from the managed device,
forming a new data package including the new second data, and
providing the new data package to the second computing device.

8. The machine-implemented of claim 1, further comprising:
encrypting at least a portion of the second data using a public key of a third party associated with the managed device before performing the providing the new data package to the second computing device.

9. A computing device comprising:
at least one processor;
a controller for communicating with a managed device executing embedded firmware;
a communication bus; and
at least one item from a group consisting of a memory and a combination of the memory and at least one hardware component, the at least one item being configured to cause the computing device to perform a method comprising:
monitoring by a health monitor a state of the computing device with respect to communications with the managed device,
detecting a sickness condition with respect to the communications with the managed device,
determining by the health monitor that the managed device may soon fail,
triggering, as a result of the detecting of the sickness condition, collection of sickness telemetry including first sickness data periodically collected from the computing device and second sickness data periodically collected from the managed device by the computing device and snapshot data, the snapshot data further comprising information regarding delays of the managed device in response to requests from the computing device,
combining the collected first sickness data and the collected second sickness data into at least one package of collected sickness data, the at least one package of collected sickness data including a section for the first sickness data and a section for the second sickness data, and
sending the at least one package of collected sickness data to at least one second computing device for storage and analysis.

10. The computing device of claim 9, wherein the method further comprises:
providing an application program interface for an application to request and receive first data from the computing device and second data from the managed device.

11. The computing device of claim 9, wherein the method further comprises:
encrypting the second sickness data included in the package of collected sickness data with a public key of a third party.

12. The computing device of claim 9, wherein the method further comprises:
detecting a failure condition with respect to the managed device;
collecting, in response to the detecting of the failure condition, first failure data from the computing device and second failure data from the managed device;
combining the first failure data and the second failure data into at least one package of collected failure data having a section for the first failure data and a section for the second failure data, the section for the second failure data has a header including routing information to be used by the at least one second computing device to queue at least one portion of the second failure data for delivery to a third party associated with the routing information; and
sending the at least one package of collected failure data to the at least one second computing device for the storage and the analysis.

13. The computing device of claim 12, wherein the section for the second failure data includes a code which provides information about the failure condition with respect to the storage device.

14. The computing device of claim 12, wherein the method further comprises:
detecting, upon startup of the computing device, that the managed device has new second failure data to be collected;
collecting the new second failure data;
packaging the new second failure data into at least one package of new collected failure data; and
sending the at least one package of new collected failure data to the at least one second computing device for the storage and the analysis.

15. The computing device of claim 12, wherein the at least one package of collected failure data has an extensible format.

16. A machine-readable storage medium having instructions recorded thereon for at least one processor of a computing device to perform a method comprising:
detecting a failure condition by a health monitor with respect to a managed device physically connected to the computing device;
collecting first failure data from the computing device in response to the detecting of the failure condition, the first failure data including environmental data and up to a predetermined number of latest requests which the computing device attempted to send to the managed device;
attempting to collect second failure data from the managed device, the second failure data having up to a second predetermined number of requests received by the managed device from the computing device, the second failure data further comprising information regarding delays of the managed device in response to requests from the computing device;
packaging the collected first failure data into a first section included in a package of collected failure data;
packaging the collected second failure data, if collected, into a second section included in the package of collected failure data, the package of collected failure data having an extensible format; and
providing the package of collected failure data to at least one second computing device for storage.

17. The machine-readable storage medium of claim 16, wherein the environmental data includes configuration data of the computing device.

18. The machine-readable storage medium of claim 16, wherein the method further comprises:
periodically collecting first telemetry data from the computing device;
packaging the collected first telemetry data into a package of collected telemetry data; and
providing the package of collected telemetry data to the at least one second computing device for storage.

19. The machine-readable storage medium of claim 16, wherein the method further comprises:
- periodically collecting second telemetry data from the managed device;
- packaging the collected second telemetry data into a package of collected telemetry data; and
- providing the package of collected telemetry data to the at least one second computing device for storage.

20. The machine-readable storage medium of claim 16, wherein the method further comprises:
- detecting one of a plurality of conditions that indicate a problem regarding the managed device;
- starting a periodic collection of first sickness data from the computing device and second sickness data from the managed device;
- packaging the collected first sickness data into a first section of a package of collected sickness data;
- encrypting the collected second sickness data;
- packaging the encrypted collected second sickness data into a second section of the package of collected sickness data; and
- providing the package of collected sickness data to the at least one second computing device.

* * * * *